United States Patent Office 3,098,597
Patented July 23, 1963

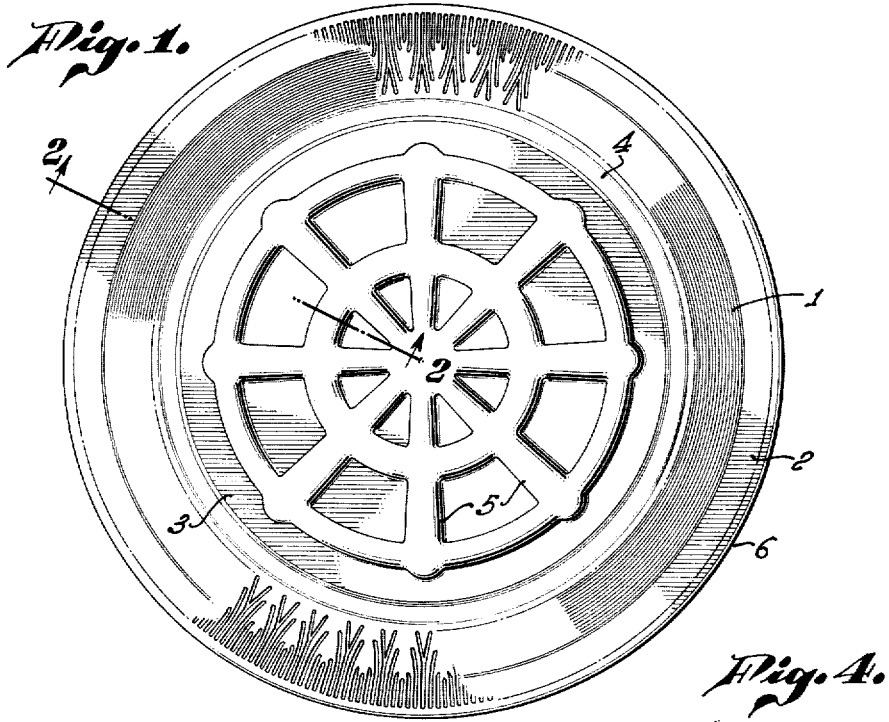
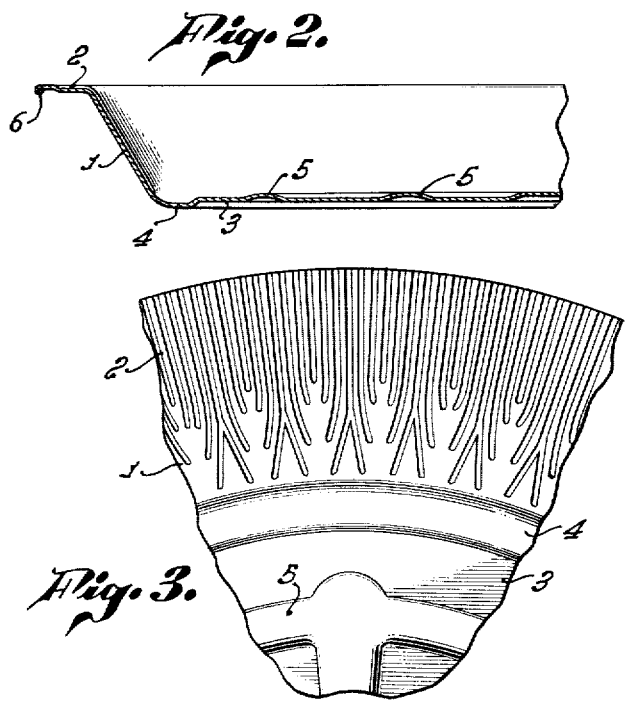
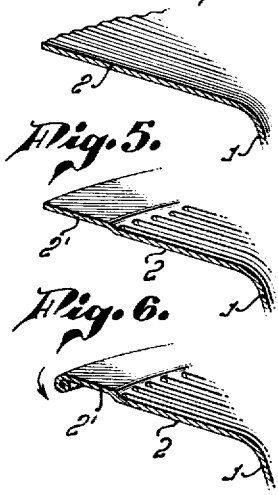
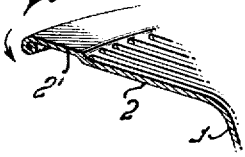
July 23, 1963 — A. J. JOHNSON ETAL — 3,098,597
COOKING AND BAKING UTENSIL
Filed Feb. 27, 1953
A. J. JOHNSON,
J. A. MOORE,
INVENTORS.
BY O. O. Martin
ATTORNEY.

3,098,597
COOKING AND BAKING UTENSIL
Alpha J. Johnson and John A. Moore, Los Angeles, Calif., assignors to Kaiser Aluminum & Chemical Corporation, Oakland, Calif., a corporation of Delaware
Filed Feb. 27, 1953, Ser. No. 339,222
1 Claim. (Cl. 229—2.5)

This invention relates to baking utensils such as dishes or plates used in bakeries as well as in kitchens; and, more particularly, to baking dishes or plates made from thin aluminum or aluminum alloy foil.

Numerous attempts have been made to produce baking utensil of thin metallic foil since such utensils provide for an even distribution of heat during baking and present a very attractive appearance. Metallic foil baking dishes or pie plates compare favorably, in cost, with paper plates; and, therefore, may be considered disposable. Thus plates of this type may be used in bakeries for baking operations and, as well, as disposable, non-returnable containers for bakery products. This is very desirable, since marketing studies have shown that bakery products displayed in metallic foil baking utensils sell more rapidly than products displayed in paper plates which products have been transferred to such plates after being baked in the standard metal pie plate customarily used and reused in bakeries. Frozen food processors have also found foil baking utensils very desirable. Unbaked pies and similar products may be placed in foil baking utensils and sold to the consumer who employs the foil utensil as a baking utensil. The consumer need not, therefore, transfer the unbaked product to an unsuitable cooking utensil to prepare the food for consumption.

The metallic foil baking utensils marketed heretofore have been unsatisfactory. Where dishes or other cup-shaped articles are to be made from heavier metal, it is merely required to draw the metal into the desired shape, but where the material is thin metal foil this method cannot be used because the metal foil will break the moment the pressure required to stretch the metal is applied thereto. It is for this reason the commonly accepted practice to form baking dishes from thin metal foil by compressing the metal, the result being that the portion of the material along the outwardly flaring sides and upper rim thereof becomes crimped or corrugated; no commercial practical methods having been devised capable of so completely compressing such thin foil as to produce smooth and even side walls and rims. While such compressed and crimped utensils are in commercial use in the kitchen at the present time, it is found that they lack the rigidity and sturdiness required to retain the shape of the dishes during ordinary handling thereof and that particularly the upper rims of the dishes become too easily bent out of shape, thereby rendering the utensil unfit for use. Nor have such crimped articles been found practical for use in commercial baking establishments where mechanical means is provided for delivering the dishes one by one from a stack of dishes. This is due to the fact that the crimped rims of the stack of dishes seat so tightly on top of each other that the mechanical element which is movable against the edge of the uppermost dish to dislodge it laterally from the stack cannot get a grip thereon.

It has been proposed and many attempts have been made to reinforce the rim of a utensil by mounting thereon a folded band of a size entirely to encompass the edge of the rim, but this method of reinforcing a rim has not been found commercially practical partly on account of the additional expense and also because of the difficulty of compressing the folded band so tightly against the corrugated surface of the rim that it will remain rigidly in position thereon and not become dislodged during ordinary use of the dish.

It is in view of the foregoing the object of the present invention to provide a utensil or dish of a type above described, the edge of the rim of which is curled downwardly and inwardly to produce a tubular reinforcement of sufficient rigidity to make the utensil commercially practical. The edge of the rim is in this manner also made thick enough for contact by the dislodging element of a dish dispensing mechanism. It is a further object of the invention to provide a satisfactory reinforcement of the rim of the utensil.

Still another object of this invention is to provide a baking utensil formed of thin aluminum or aluminum alloy foil which utensil is provided with a laterally-extending rim portion having reinforcing corrugations and a full-rolled reinforcing bead in the peripheral edge thereof.

The foregoing and other objects of this invention, as well as the many advantageous features thereof will be fully appreciated from the following detailed description, particularly when reference is had to the accompanying drawings in which the preferred form of the invention is illustrated.

In the drawings:

FIGURE 1 is a plan view of a utensil embodying this invention;

FIGURE 2 is a cross-sectional view of a portion of the utensil taken substantially on line 2—2 of FIGURE 1 in the direction of the arrows;

FIGURE 3 shows a portion of the dish of FIGURE 1 as it appears when pressed into its initial shape;

FIGURE 4 is a fragmentary, perspective edge view of the portion of the device appearing in FIGURE 3;

FIGURE 5 is like FIGURE 4, illustrating a further step in the production of the device of FIGURE 1;

FIGURE 6 is added to show the manner in which the rim of FIGURE 5 is curled to provide the reinforcing bead of the device.

As above stated, very thin metallic foil, preferably aluminum, is used and a sheet of such foil is placed in a press and compressed to form the crimped or corrugated flaring side portion 1 and the rim 2 horizontally extending therefrom. During this operation it is also found advantageous slightly to press the bottom portion 3 of the dish upwardly a short distance thereby to provide a narrow base rim 4 upon which the utensil can depend to come to rest. When in addition the bottom portion 3 of the dish is upwardly indented, as indicated at 5 in FIG. 1, it is found that the bottom portion 3 of the dish is sturdy enough to withstand rough use. The upper rim of the dish, on the other hand, is not always found sturdy enough to withstand the careless handling such utensils ordinarily are subjected to. Reinforcement of the rim of the utensil is, for this reason, most essential and the logical manner of reinforcing the device is to curl the upper edge thereof to form a continuous, tubular bead 6. Several attempts were made so to curl the edge of the dish, by means of curling rollers as well as by successive forming operations, but it was found impossible to curl the crimped or corrugated flange because it would become necessary in order to do this further to compress or rather to displace the material which already had been crowded to its limits; at least by means of such tools and equipment as are available for this purpose at the present time.

It was then decided to attempt first to compress or flatten the outer portion of the rim 2 and it was found that, when rollers were applied to this portion of the rim for this purpose, the material to which pressure was applied was free to spread outwardly until a substantially very thin, smooth and even margin 2′ was obtained. Having obtained this compressed or flattened margin which is a minor portion of the radial extent of the rim and with the corrugations terminating at the inner edge of the flattened margin, it was found possible to apply curling rollers to this margin to produce the tubular bead 6.

The utensils comprising this invention may be formed of thin aluminum foil of a thickness of about 0.005" and less by forcing the metal foil to conform to the shape of any forming surface having a shape corresponding to that of the utensil to be produced; such as, for example, the pie plate shown in FIGURES 1 and 2. A blank of the aluminum foil is formed which has an area larger than the total area of the forming surface to which it is to be applied. The periphery of the blank is then secured or clamped in position above the forming shape; such as for example, adjacent the laterally-extending cavity mold. Pressure is then applied uniformly over the entire surface of the secured blank. The blank is thus forced to conform to the shape of the forming surface; and, as the blank contains a larger area than that of the forming surface, the excess foil forms corrugations or ribs in the side wall and the laterally extending rim portion of the utensil as are shown in FIGURES 1 through 3 of the drawings.

The formation of a full-rolled bead in the rim 2 of the utensil is difficult in view of the presence of the corrugations therein as shown in FIGURE 4. By this invention the outer marginal edge of the rim portion 2 as is shown in FIGURE 5 is progressively smoothed. Thereafter, the smooth or flattened edge or margin may be progressively curled to form a full-rolled reinforcing bead such that the free edge of the margin terminates in an integral bead. The beginning of this edge rolling operation is shown in FIGURE 6 and the rolling is continued until a full-rolled bead is formed. The laterally-extending rim 2, when completely formed, includes a full-rolled reinforcing bead 6 at the peripheral edge of the rim 2 and the remainder of the rim contains reinforcing as are shown in FIGURE 1.

It is seen from the foregoing description that we have produced a light and sturdy utensil which is formed from a single sheet of thin metallic foil.

This application is a continuation in part of applicants' co-pending application Ser. No. 197,276, filed November 24, 1950, now abandoned.

We claim:

A thin metallic pie plate comprised of thin aluminum foil, a circular main bottom portion, an outwardly flaring side wall portion integrally joined to said main bottom portion, said outwardly flaring side wall portion being formed with a plurality of corrugations, and a rim integrally joined to the upper outer edge of the outwardly flaring side wall portion and extending therefrom, the corrugations in the outwardly flaring side wall portion being continued over into and terminating in said rim, said rim having a flattened margin encircling said plate, the free edge of the margin terminating in an integral bead, the radial extent of said flattened margin being a minor portion of the radial extent of the rim and said corrugations terminating at the inner edge of the flattened margin.

References Cited in the file of this patent

UNITED STATES PATENTS

| 476,340 | Wagandt | June 7, 1892 |
| 1,956,914 | Westin | May 1, 1934 |
| 2,014,297 | Rutledge | Sept. 10, 1935 |
| 2,073,498 | Seez | Mar. 9, 1937 |
| 2,125,793 | Linderman | Aug. 2, 1938 |
| 2,174,425 | Schlumbohm | Sept. 26, 1939 |
| 2,260,651 | Annen | Oct. 28, 1941 |
| 2,633,523 | Gibson | Mar. 21, 1953 |

FOREIGN PATENTS

| 103,316 | Australia | June 11, 1926 |
| 959,813 | France | Jan. 15, 1948 |
| 602,743 | Great Britain | June 2, 1948 |

UNITED STATES PATENT OFFICE

CERTIFICATE OF CORRECTION

Patent No. 3,098,597　　　　　　　　　　　　　　July 23, 1963

Alpha J. Johnson et al.

It is hereby certified that error appears in the above numbered patent requiring correction and that the said Letters Patent should read as corrected below.

Column 3, line 34, after "reinforcing" insert -- corrugations --.

Signed and sealed this 26th day of May 1964.

(SEAL)
Attest:

ERNEST W. SWIDER
Attesting Officer

EDWARD J. BRENNER
Commissioner of Patents